Jan. 13, 1931.  E. WILSON  1,788,966
AUTOMATICALLY ADJUSTABLE SEAL PACKING
Filed Aug. 11, 1926
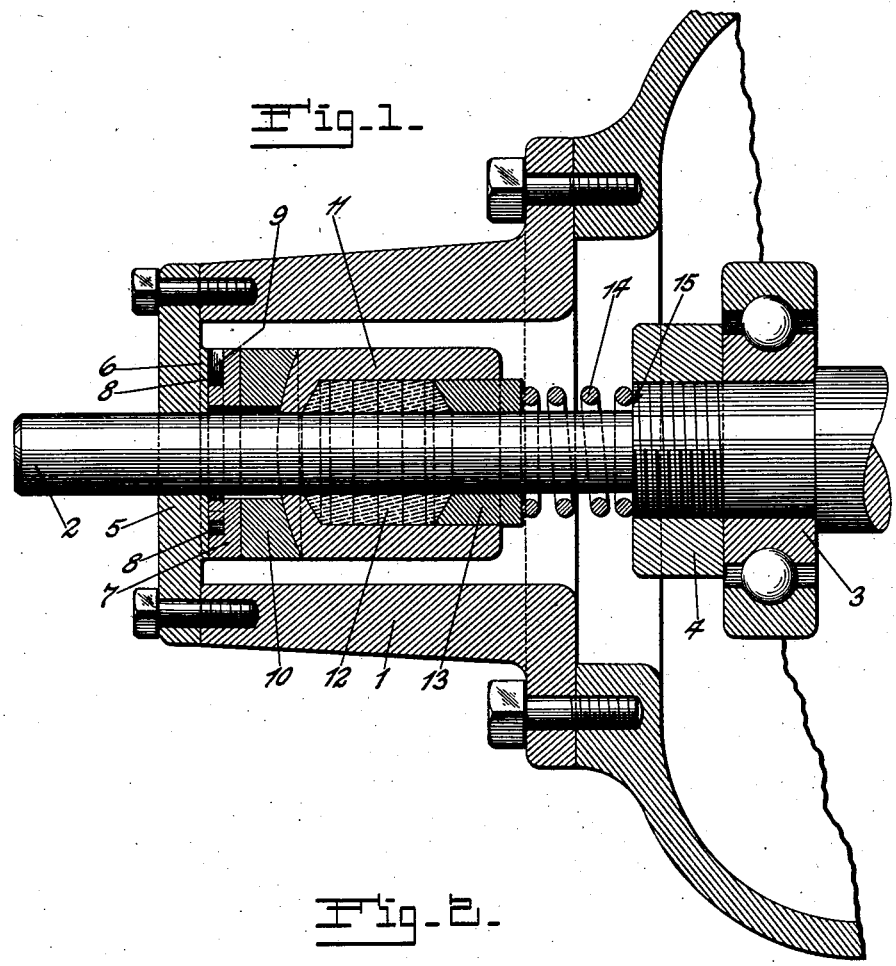
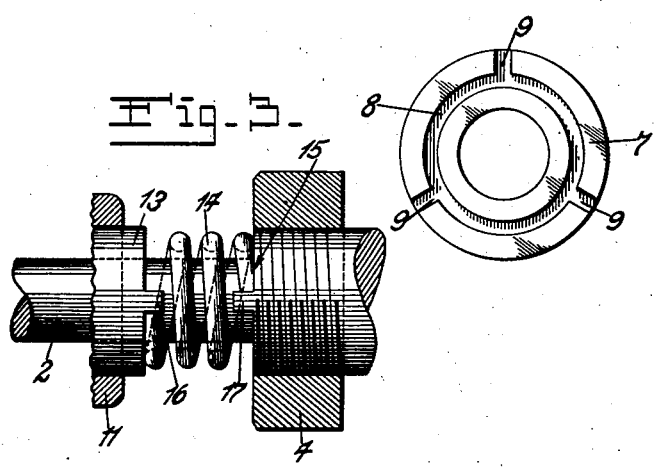
Inventor:
Edward Wilson,
by Rippey & Kingsland
his Attorneys.

Patented Jan. 13, 1931

1,788,966

UNITED STATES PATENT OFFICE

EDWARD WILSON, OF ST. LOUIS, MISSOURI

AUTOMATICALLY-ADJUSTABLE SEAL PACKING

Application filed August 11, 1926. Serial No. 128,553.

This invention relates to an automatically adjustable seal packing, and is specially designed for use in connection with rotary or rocking shafts of compressors and pumps, though it will be understood from the following description that the device is capable of many advantageous uses.

An object of the invention is to provide an automatically adjustable seal packing designed and arranged to be mounted upon a rotating or rocking shaft of a compressor or pump, or other machine in which such seal packing is useful, and comprising a stuffing box mounted on the shaft and containing packing and provided with a convex end seated within a concave recess of an alining washer, the opposite side of which washer bears against a wearing washer element abutting against a stationary part of the machine.

Another object of the invention is to provide an improved seal packing embodying the elements arranged in the relationship mentioned and combined with a spring actuator pressing the packing into the housing and the housing against the alining washer.

Another object of the invention is to provide a structure in which the stuffing box and its contents will be rotated with the shaft and held in proper relationship to each other by the spring which presses the packing into the stuffing box and the elements in proper relationship to each other.

Other objects will appear from the following description, reference being made to the accompanying drawing in which Fig. 1 is a longitudinal sectional view of the invention embodied in a compressor.

Fig. 2 is a view showing the outer side of the wearing washer provided with pressure balancing and oil grooves.

Fig. 3 is a view showing the means whereby the spring rotates the packing with the shaft.

The machine in which the invention is shown comprises a seal housing 1, a rotary shaft 2 equipped with an anti-friction bearing 3, and a nut 4 screwed on the shaft and holding the anti-friction bearing thereon. The outer end of the seal housing 1 is closed by an end plate 5 through which the shaft 2 extends.

For use with the present invention the end plate 5 is shown as provided with an inwardly extended wearing portion 6.

The wearing washer 7 constituting one of the elements of the seal packing is provided with a centrally formed hole through which the shaft 2 extends, and with an annular groove 8 in its outer side having radial grooves 9 leading to the outer periphery of the washer. This washer is mounted on the shaft 2 with the grooved side of said washer against the wearing portion 6 of the end plate. The grooves 9 and 8 function as passages for lubricant and for the compressed air or gas, so that the grooved washer serves as a pressure balancing and lubricating device; for by means of the grooves the compressed air or gas is admitted to the outer side of the washer in proper proportion to balance, to a large extent at least, the pressure against the inner end of the packing. As the hole through the washer, through which the shaft 2 extends, is of larger diameter than the diameter of the shaft, proper relative adjustment of the parts is more easily obtained during assembly and thereafter the parts may automatically assume and maintain such relationship as renders their operation and function more nearly perfect.

Against the plane inner side of the washer 7 a self-alining washer 10 bears. The washer 10 is provided with a hole of larger diameter than the shaft 2 whereby said washer 10 may assume and maintain proper relationship to the other parts of the packing, without causing strains to any of the parts. The abutting surfaces of the washers 7 and 10 are smooth and plain, and the inner side of the washer 10 is concave to receive the convex outer end of a stuffing box housing 11. The stuffing box housing 11 contains a quantity of packing 12 pressed therein by a gland 13 extending into the housing 11 and pressed outwardly by a spring 14. The spring 14 encircles the shaft 2 and has its outer end bearing against the gland 13 and its inner end against a circumferential shoulder 15 on the shaft 2, forming the outer extremity of an enlarged portion of said shaft upon which the nut 4 is screwed. Abutments 16 and 17 may be provided upon the gland 13 and the shoulder 15, respectively, for the ends of the spring 14; so that said spring will be rotated by the shaft 2 and will thereby rotate the packing but will yield sufficiently to prevent absolute relative rigidity of the parts.

My improved seal packing has been found highly satisfactory in preventing leakage around the shafts of compressors and pumps which has heretofore been a problem difficult of solution.

The beneficial results desired are obtained because of the structure and relationship of the parts, whereby the washer 10 permits the stuffing box to assume and be maintained in proper adjustment in the shaft; and whereby proper lubrication and balancing of the elements of the packing are obtained by the structure of the wearing washer 7. These parts may be varied in their specific structures and relationship without departure from the nature and principle of the invention.

I do not restrict myself in unessential particulars, but what I claim and desire to secure by Letters Patent is:—

1. A seal packing of the character described comprising a stationary bearing, a rotary shaft mounted in said bearing, a wearing washer mounted on said shaft and abutting against said bearing for rotary and radial movements relative to said shaft, an alining washer loosely mounted on said shaft and abutting against said wearing washer for radial and rotative movements relative to said shaft and said wearing washer and being concave on its side opposite from said wearing washer, a stuffing box on said shaft having an end wall bearing against the shaft and having a convex outer end surface bearing against the concave side of said alining washer, and a concave compressor within said stuffing box.

2. A seal packing of the character described comprising a stationary bearing, a rotary shaft mounted in said bearing, a wearing washer mounted on said shaft and abutting against said bearing for rotary and radial movements relative to said shaft, an alining washer loosely mounted on said shaft and abutting against said wearing washer for radial and rotative movements relative to said shaft and said wearing washer and being concave on its side opposite from said wearing washer, a stuffing box on said shaft having an end wall bearing against the shaft and having a convex outer end surface bearing against the concave side of said alining washer, a packing within the stuffing box, and a spring encircling said shaft and pressing said packing within the stuffing box and pressing said stuffing box against said alining washer.

3. A seal packing of the character described comprising a bearing element, a rotary shaft extending through said element, a wearing washer on said shaft bearing against said element and provided with an annular groove and with grooves from its edge opening into the annular groove in the side of said wearing washer toward said bearing element, an alining washer loosely mounted on said shaft and bearing against said bearing element and being capable of radial and rotative movements relative to said shaft and having a concave recess in its side opposite from said wearing washer, a stuffing box having a convex end bearing against the wall of said concave recess, and means supported by said shaft for holding said stuffing box pressed against said alining washer as aforesaid.

4. A seal packing of the character described comprising a bearing element, a rotary shaft extending through said element, a wearing washer on said shaft bearing against said element and provided with an annular groove and with grooves from its edge opening into the annular groove in the side of said wearing washer toward said bearing element, an alining washer loosely mounted on said shaft and bearing against said bearing element and being capable of radial and rotative movements relative to said shaft and having a concave recess in its side opposite from said wearing washer, a stuffing box having a convex end bearing against the wall of said concave recess, a spring encircling said shaft and pressing said stuffing box against said alining washer as aforesaid, and means for rotating said spring and thereby said stuffing box with said shaft.

EDWARD WILSON.